United States Patent [19]

Kimura et al.

[11] Patent Number: 5,600,673
[45] Date of Patent: Feb. 4, 1997

[54] CIRCUIT FOR DISCRIMINATING RECEIVED SIGNAL MODULATION TYPE

[75] Inventors: Kimiyoshi Kimura, Tokyo; Kenichi Shiraishi, Yokohama; Souichi Shinjo, Machida, all of Japan

[73] Assignee: Kabushiki Kaisha Kenwood, Tokyo, Japan

[21] Appl. No.: 566,082

[22] Filed: Dec. 1, 1995

[30]     Foreign Application Priority Data

Dec. 5, 1994   [JP]   Japan ..................................... 6-329268

[51] Int. Cl.$^6$ ..................................................... H04B 3/46
[52] U.S. Cl. ......................... 375/224; 455/142; 455/228
[58] Field of Search ............................ 455/61, 102, 142, 455/144, 228, 206, 207; 375/326, 331, 332, 335, 224, 226, 224

[56]             References Cited

U.S. PATENT DOCUMENTS 5,260,975  11/1993  Saito ....................................... 375/329

Primary Examiner—Stephen Chin
Assistant Examiner—Kerim Kim
Attorney, Agent, or Firm—Sixbey, Friedman, Leedom & Ferguson, P.C.; Gerald J. Ferguson, Jr.

[57]              ABSTRACT

A circuit for discriminating the modulation type of a received signal capable of discriminating the modulation type at high speed. This circuit includes: a clock recovery circuit for recovering a data clock from received data; a phase difference detector for detecting a phase difference between the data clock recovered by the clock recovery circuit and the received data; a deviation calculation circuit for calculating a deviation between the phase difference detected by the phase difference detector and a deviation reference value preset in accordance with a modulation type; a squaring circuit for squaring the deviation calculated by the deviation calculation circuit; an average value calculation circuit for calculating an average value of a predetermined plurality number of consecutive ones of the square output calculated by the squaring circuit; and a comparator for comparing the average value calculated by the average value calculation circuit with a predetermined decision reference value and outputting a discrimination signal in accordance with the comparison results.

2 Claims, 5 Drawing Sheets

FIG. 3A
FIG. 3B
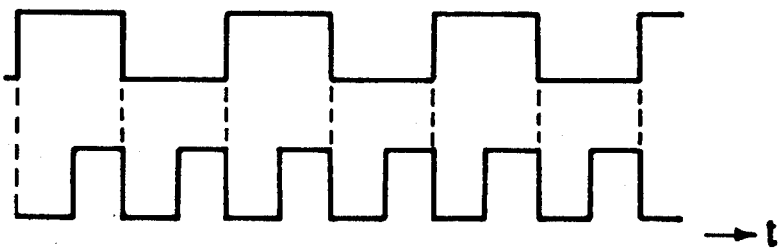
FIG. 4A
FIG. 4B
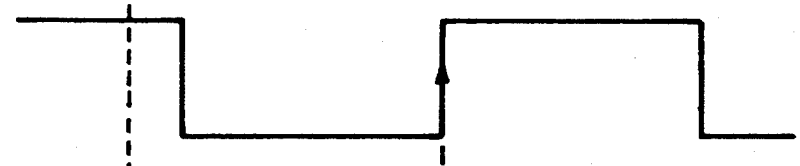
FIG. 4C
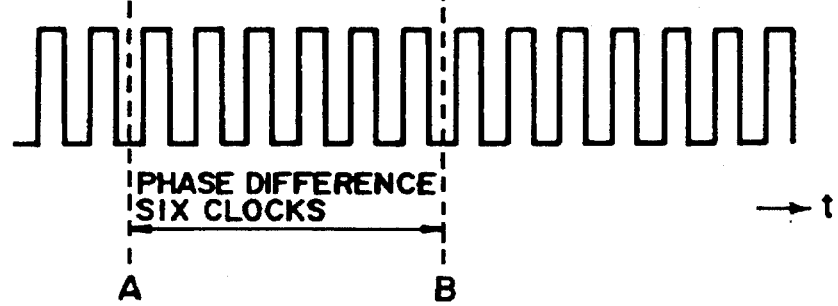

PHASE DIFFERENCE FIVE CLOCKS

A          B

→ t

"5"   "5"   "5"   "5"      "5"

→ t

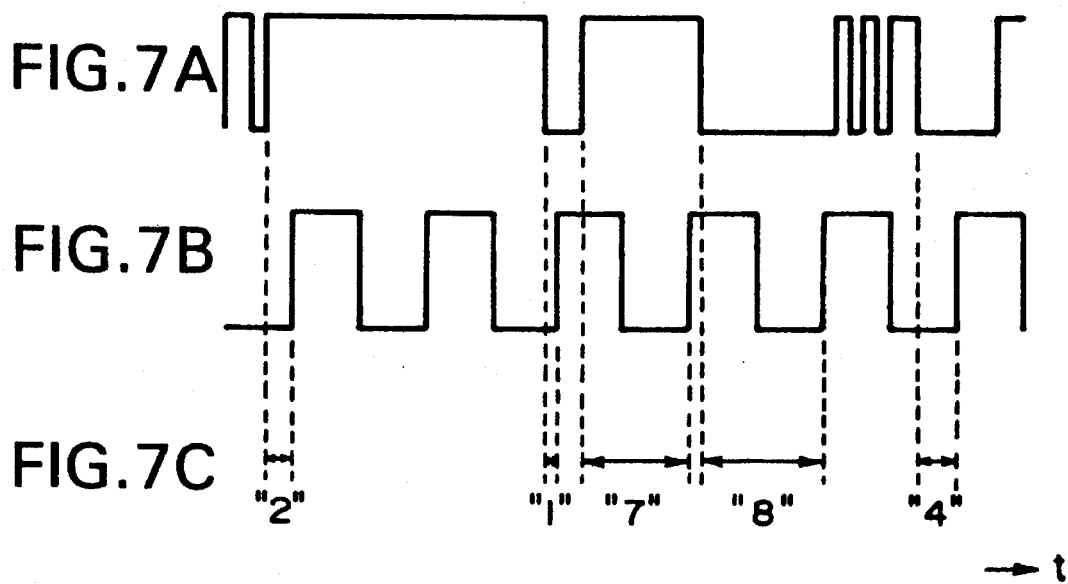
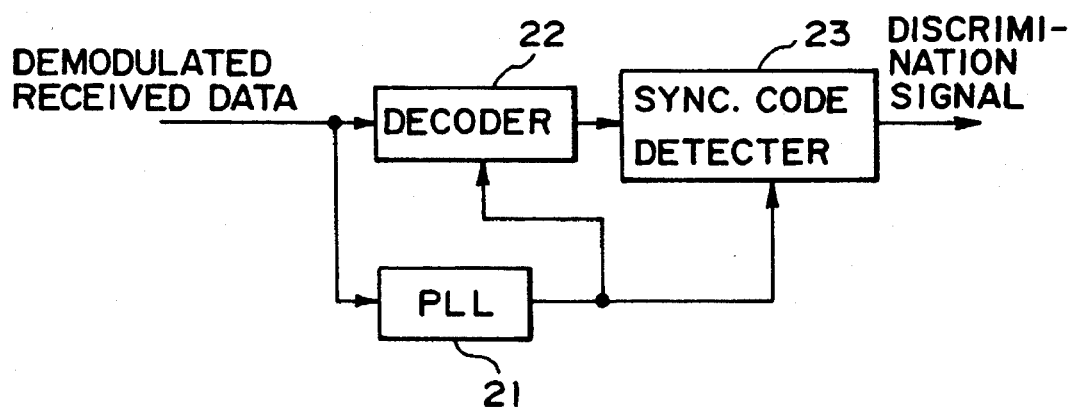
FIG. 8

CIRCUIT FOR DISCRIMINATING RECEIVED SIGNAL MODULATION TYPE

BACKGROUND OF THE INVENTION

1. Field of the Invention

The present invention relates to a circuit for discriminating the modulation type of a received signal. More particularly, the invention relates to a circuit for discriminating the modulation type of a received signal, capable of being used for digital radio communications such as urgent communications over an ordinary communications line by using a signal of a modulation type different from the ordinary communications.

2. Related Background Art

For example, the Okinawa meteorological satellite communications line ordinarily used by communications between remote islands is also used as an urgent communications line by switching between both the lines which use the same frequency band. In such a radio communications system, a different modulation type is used for the ordinary and urgent communications lines. In the case of the Okinawa communications line, QPSK (Quadrature Phase-Shift Keying) is used for the ordinary communications line and BPSK (Binary Phase-Shift Keying) is used for the urgent communications line. In order to receive a signal of the urgent communications, it is desired to correctly and quickly discriminate the received signal modulation type.

A radio wave (carrier) transmitted in such a radio communications system changes its frequency with some factors such as a temperature. In order to track this frequency change on the receiver side, an automatic frequency control (AFC) circuit is used. Generally in a reception operation of a signal having a desired frequency, the AFC circuit of the radio communications system first scans a desired frequency and then tracks a change in the scanned and locked frequency. The operation of scanning a desired frequency is called an RF scanning mode, and the operation of tracking a change in the scanned and locked frequency is called a lock mode.

For the communications of a plurality of digital communications systems using the same frequency on the radio communications line, burst mode transmission/reception is used in which a time axis is segmented into bursts and transmission/reception of each digital communications system is allowed only during a particular burst period assigned thereto. Immediately after this particular burst is received during the RF scanning mode, the operation is switched to the lock mode and the particular burst is maintained to be received. If a reception of the particular burst is terminated and a different burst is received, the operation is switched to the RF scanning mode.

It is therefore necessary to judge whether a received burst is a desired one. Receiving a desired burst means receiving a signal of a desired modulation type. Namely, it is necessary to discriminate the modulation type of a received signal in order to switch between the RF scanning mode and lock mode of burst mode transmission/reception.

In a conventional circuit such as shown in FIG. 8 for discriminating the modulation type of a received signal, a PLL 21 extracts data clocks from received and demodulated data, the demodulated data is decoded by a decoder 22 by using the extracted data clocks, a sync code is detected from the decoded data by a sync code detector 23 by using the extracted data clock, and the modulation type of the received signal is discriminated in accordance with the sync code.

This circuit for discriminating the modulation type of a received signal is, however, complicated and takes some time to decode the modulated data and detect the sync code, being unable to discriminate the modulation type at high speed.

Still further, with the conventional received signal modulation type discriminating circuit, although the preamble data and other data are positioned at the start of the data format, it is necessary to detect the sync code positioned after the preamble data. Therefore, there is a time delay between the reception of a radio wave and the discrimination whether the received radio wave is of the desired modulation type.

It takes, therefore, a long time to switch the RF scanning mode of the AFC circuit to the lock mode after the signal of the desired modulation type is received. A start portion of the desired burst is therefore lost. Still further, if the sync code is not detected during the reception of the desired burst because of noises and jitters, the discrimination results in that a signal of the desired modulation type is not received, although the signal of the desired modulation type is being actually received.

SUMMARY OF THE INVENTION

It is an object of the present invention to provide a received signal modulation type discriminating circuit capable of correctly discriminating the modulation type of a received signal at high speed.

According to one aspect of the invention, there is provided a circuit for discriminating the modulation type of a received signal, comprising: a clock recovery circuit for recovering a data clock from received data; a phase difference detector for detecting a phase difference between the data clock recovered by the clock recovery circuit and the received data; a deviation calculation circuit for calculating a deviation between the phase difference detected by the phase difference detector and a deviation reference value preset in accordance with a modulation type; a squaring circuit for squaring the deviation calculated by the deviation calculation circuit; an average value calculation circuit for calculating an average value of a predetermined plurality number of consecutive ones of the square output calculated by the squaring circuit; and a comparator for comparing the average value calculated by the average value calculation circuit with a predetermined decision reference value and outputting a discrimination signal in accordance with the comparison results.

According to another aspect of the present invention, there is provided a circuit for discriminating the modulation type of a received signal, comprising: a clock recovery circuit for recovering a data clock from received data; a phase difference detector for detecting a phase difference between the data clock recovered by the clock recovery circuit and the received data; a deviation calculation circuit for calculating a deviation between the phase difference detected by the phase difference detector and a deviation reference value preset in accordance with a modulation type; an absolute deviation calculating circuit for calculating an absolute deviation of the deviation calculated by the deviation calculation circuit; an absolute deviation average calculation circuit for calculating an average value of a predetermined plurality number of consecutive ones of the absolute deviation calculated by the absolute deviation calculating circuit; and a comparator for comparing the absolute deviation average value calculated by the absolute deviation average calculation circuit with a predetermined decision reference value and outputting a discrimination signal in accordance with the comparison results.

In the received signal modulation type discriminating circuit of this invention, a data clock is recovered from received data by the clock recovery circuit, a phase difference between the recovered data clock and the received data is detected by the phase difference detector, a deviation between the detected phase difference and the deviation reference value preset in accordance with a modulation type is calculated by the deviation calculation circuit, the calculated deviation is squared by squaring circuit, and an average value of a predetermined plurality number of consecutive ones of the square output is calculated by the average value calculation circuit. The average value calculated by the average value calculation circuit is compared with the predetermined decision reference value and the comparison results are outputted as the discrimination signal, by the comparator. Accordingly, a discrimination whether the received signal is a signal of a desired modulation type can be made immediately after the received signal is changed to a signal of the desired modulation type, without waiting for the sync signal detection. Furthermore, since the discrimination is made based upon the calculation of the average value, a change in the received signal to be caused by noises or jitters can be smoothed. Therefore, the number of erroneous discriminations can be reduced and the correct discrimination is possible.

In the other aspect of the invention, the absolute deviation of the deviation calculated by the deviation calculation circuit is calculated by the absolute deviation calculating circuit, the average value of a predetermined plurality number of consecutive ones of the calculated absolute deviation is calculated by the absolute deviation average calculation circuit, and the calculated absolute deviation average value is compared with the predetermined decision reference value and the comparison results are outputted as the discrimination signal by the comparator. Accordingly, similar to the first aspect of the invention, a discrimination whether the received signal is a signal of a desired modulation type can be made immediately after the received signal is changed to a signal of the desired modulation type, without waiting for the sync signal detection. Furthermore, since the discrimination is made based upon the calculation of the average value, a change in the received signal to be caused by noises or jitters can be smoothed. Therefore, the number of erroneous discriminations can be reduced and the correct discrimination is possible.

BRIEF DESCRIPTION OF THE DRAWINGS

FIG. 3 shows waveforms of received data and data clocks, illustrating the operation of the circuit for discriminating the modulation type of a received signal of the invention.

FIG. 4 shows waveforms illustrating a phase difference detection by the circuit for discriminating the modulation type of a received signal of the invention.

FIG. 7 shows waveforms illustrating a reception of a signal having a different modulation type, by the circuit for discriminating the modulation type of a received signal of the invention.

FIG. 8 is a block diagram showing the structure of a conventional circuit for discriminating the modulation type of a received signal.

DETAILED DESCRIPTION OF THE PREFERRED EMBODIMENTS

An embodiment of the invention will be described with reference to the accompanying drawings.

Figure 1:
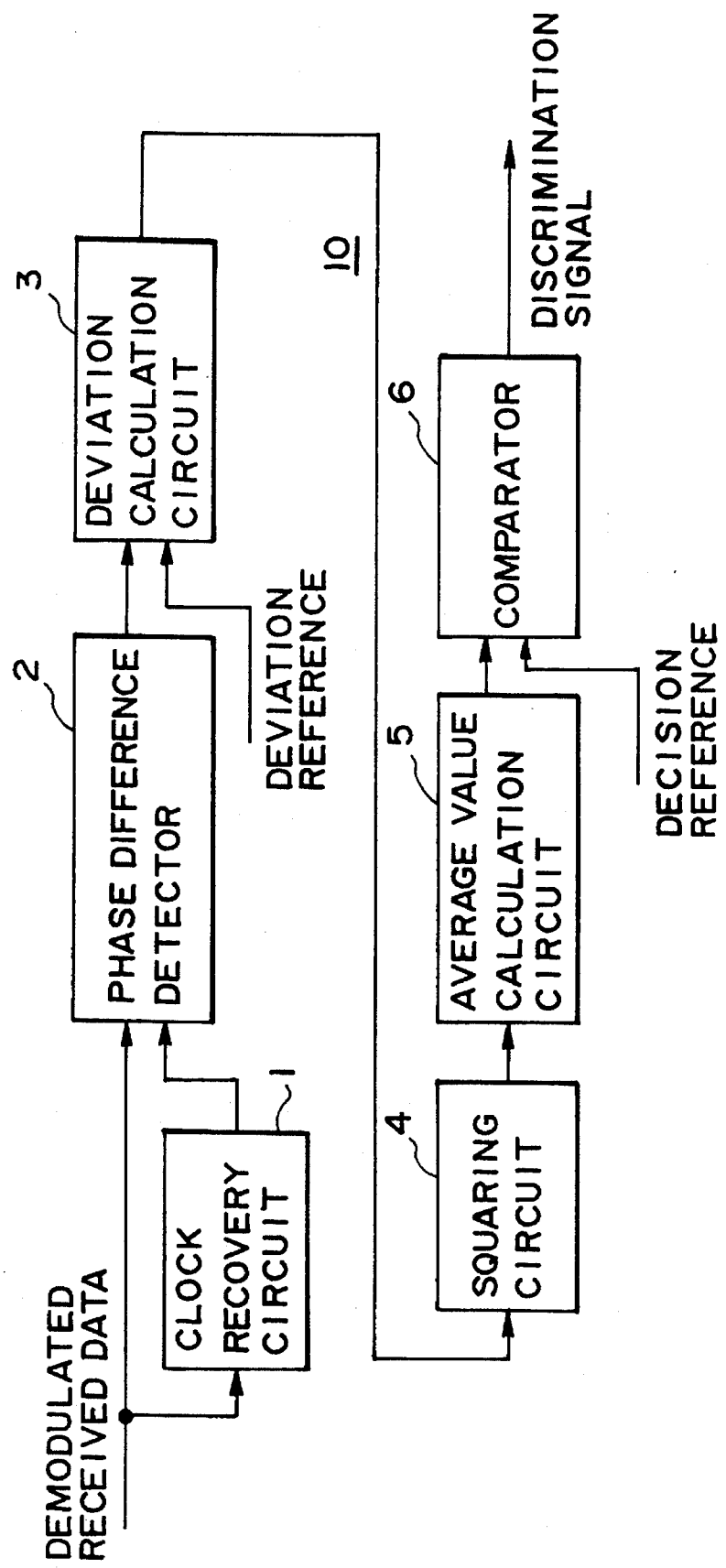
FIG. 1 is a block diagram showing the structure of a circuit for discriminating the modulation type of a received signal according to an embodiment of the invention.
Figure 2:
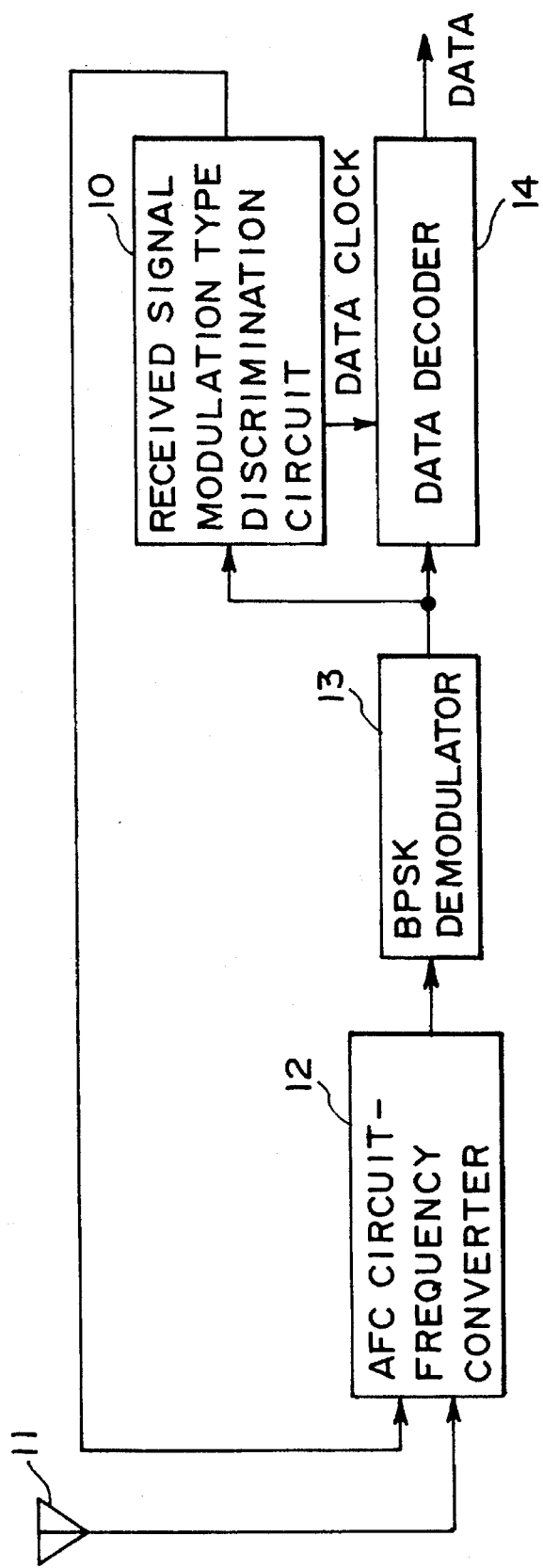
FIG. 2 is a block diagram showing the structure of a digital radio communications apparatus using the circuit for discriminating the modulation type of a received signal of the invention.

FIG. 1 is a block diagram showing the structure of a circuit for discriminating the modulation type of a received signal according to an embodiment of the invention, and FIG. 2 is a block diagram showing the structure of a digital radio communications apparatus using the embodiment circuit. In this embodiment, it is assumed to discriminate a BPSK modulation type of a received signal.

A radio wave received by an antenna 11 is converted into a voltage signal, and supplied to a frequency converter 12 with an AFC circuit to be converted into an intermediate frequency signal. Similar to a conventional circuit, the AFC circuit frequency converter 12 performs RF scanning to scan a burst of a desired frequency, and when the burst of the desired frequency is scanned, the RF scanning mode is switched to the lock mode in response to a discrimination signal to be described later, and the AFC circuit—frequency converter 12 tracks a change in the desired frequency.

The intermediate frequency signal converted by the frequency converter 12 is BPSK demodulated by a BPSK demodulator 13. The data demodulated by the BPSK demodulator 13 is supplied to a received signal modulation type discriminating circuit 10 which in turn supplies a discrimination signal representative of a discrimination of BPSK demodulation of the received signal, to the frequency converter 12 so that the mode of the AFC circuit built in the converter 12 is changed to the lock mode.

The received data modulated by the BPSK modulator 12 and data clocks recovered by a clock recovery circuit 1 to be described later are supplied to a data decoder 14 whereat the received and demodulated data is decoded and outputted therefrom.

The received signal demodulation type discriminating circuit 10 supplies the received data demodulated by the BPSK demodulator 13 to the clock recovery circuit 1 which recovers data clocks from the demodulated data. The demodulated data from the BPSK demodulator 13 and the data clocks from the clock recovery circuit 1 are supplied to a phase difference detector 2 whereat a phase difference between the demodulated data and data clocks is detected by using phase difference detection clocks. The phase difference data detected by the phase difference detector 2 is supplied to a deviation calculation circuit 3 which generates by itself a deviation reference same as the deviation of phase difference data detected by the phase difference detector 2 while a signal modulated by BPSK is received. The deviation calculation circuit 3 calculates a deviation between the deviation reference and the phase difference data from the phase difference detector 2.

The received signal modulation type discriminating circuit 10 supplies the deviation data calculated by the deviation calculation circuit 3 to a squaring circuit 4 to square the deviation data. The output data of the squaring circuit 4 is supplied to an average value calculation circuit 5 whereat an average value of a predetermined consecutive n sets of the output data is calculated. In other words, the deviation calculation circuit 3, squaring circuit 4, and average value calculation circuit 5 calculate a dispersion of the phase difference data. The average data (dispersion of the phase difference data, called simply dispersion hereinafter where applicable) calculated by the average value calculation circuit 5 is compared with a decision reference by a comparator 6 which outputs a discrimination signal when the average value data (dispersion) is smaller than the decision reference.

A QPSK modulated wave used for another purpose is also transmitted to the digital radio communications apparatus, when necessary, by stopping the BPSK modulated wave. When the radio wave of QPSK modulation is received by the antenna 11, the AFC circuit in the frequency converter 12 is in the RF scanning mode for scanning a desired frequency. However, in this case, the output of the AFC circuit does not become stable and the circuits at the later stages of the frequency converter 12 are also unstable. Therefore, the AFC circuit built in the frequency converter 12 maintains the RF scanning mode.

If a received radio wave is a BPSK modulated wave, the AFC circuit in the frequency converter 12 is switched to the lock mode in response to the discrimination signal, and tracks a change in the locked frequency. Under this state, the output signal of the frequency converter 12, i.e., the intermediate frequency signal is BPSK demodulated by the BPSK demodulator 13. Data clocks are recovered by the clock recovery circuit 1 from the received signal demodulated by the BPSK demodulator 13. By using the recovered data clocks, the received data recovered by the BPSK demodulator 13 is decoded by the data decoder 14 and outputted therefrom.

The received data demodulated by the BPSK demodulator 13 is supplied to the clock recovery circuit 1 whereat the data clocks are recovered from the received and demodulated data. The received and demodulated data has a waveform shown in FIG. 3 at (a). The data clocks recovered by the clock recovery circuit 1 have a waveform shown in FIG. 3 at (b). The trailing edge of each data clock recovered by the clock recovery circuit 1 is synchronous in phase with the trailing edge of each pulse of the received data.

The received data demodulated by the BPSK demodulator 13 is also supplied to the phase difference detector 2 in which the phase difference clocks of a predetermined frequency are being generated. If the received and demodulated data is asynchronous with the data clocks, a phase difference is calculated between a point A where the received and demodulated data transits as shown in FIG. 4 at (a) and a point B where the data clock rises after the transition point A, by counting the phase difference clocks shown in FIG. 4 at (c). The phase difference is outputted as the phase difference data.

Figure 5A:
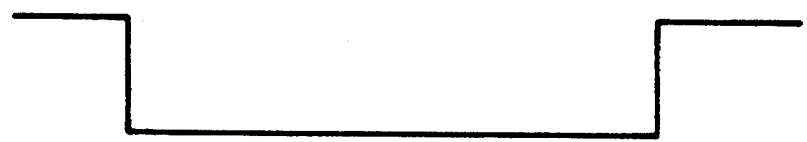
FIG. 5 shows waveforms illustrating another phase difference detection by the circuit for discriminating the modulation type of a received signal of the invention.
Figure 5B:
Figure 5C:
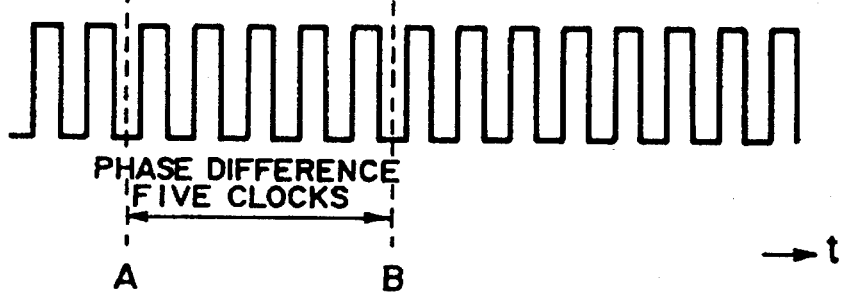

In the example shown in FIG. 4 wherein the waveform of the received and demodulated data is shown in FIG. 4 at (a), the waveform of the data clocks is shown in FIG. 4 at (b) and the waveform of the phase difference clocks is shown in FIG. 4 at (c), the phase difference data is represented by six phase difference clocks. On the other hand, if the received and demodulated data is synchronous with the data clocks, the waveforms become, for example, as shown in FIG. 5 wherein the waveform of the received and demodulated data is shown in FIG. 5 at (a), the waveform of the data clocks is shown at (b), and the waveform of the phase difference clocks is shown at (c). In this example, the phase difference data is represented by five phase difference clocks between points A and B, i.e., between the point A where the received and demodulated data falls and the point B where the data clock recovered by the clock recovery circuit 1 rises after the transition point A. In this embodiment, therefore, the deviation reference ($Y_k$) is set to "5".

The phase difference data detected by the phase difference detector 2 is supplied to the deviation calculation circuit 3 whereat a deviation between the phase difference data and the deviation reference is calculated. By representing the phase difference by ($X_k$), the deviation calculation circuit 3 calculates the following equation (1) to obtain the deviation data.

$$\text{Deviation} = X_k - Y_k \qquad \ldots (1)$$

The deviation data calculated by the deviation calculation circuit 3 is squared by the squaring circuit 4 by the following equation (2) to obtain the deviation square value.

$$\text{Deviation Square Value} = (X_k - Y_k)^2 \qquad \ldots (2)$$

The consecutive a sets of the deviation square data calculated by the squaring circuit 4 are averaged by the average value calculation circuit 5 by the following equation (3) to obtain the deviation square average value.

$$\text{Deviation Square Average Value} = \frac{\sum_{k=1}^{n} (X_k - Y_k)^2}{n} \qquad (3)$$

An output of the average value calculation circuit 5 is compared with the decision reference by the comparator 6. An output of the comparator, i.e., an output of the comparator 6 when the deviation square average data is smaller than the decision reference, is supplied as the discrimination signal to the AFC circuit built in the frequency converter 12 to switch the AFC circuit to the lock mode.

Figure 6A:
FIG. 6 shows waveforms illustrating a reception of a signal having a desired modulation type, by the circuit for discriminating the modulation type of a received signal of the invention.
Figure 6B:
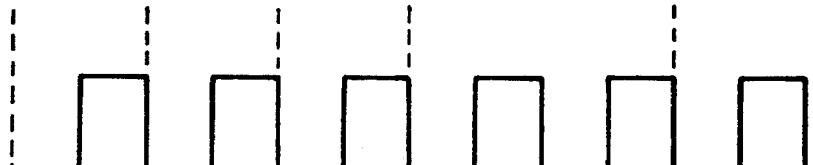
Figure 6C:
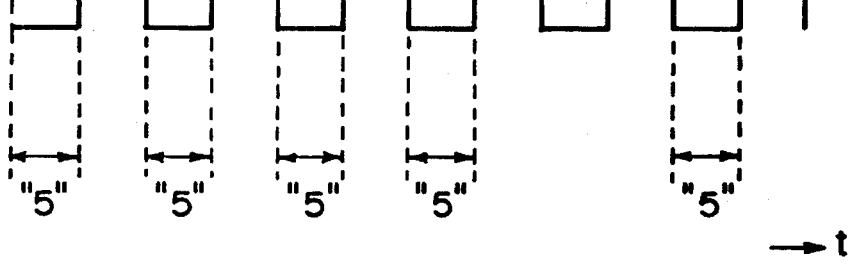

The waveforms of the received and demodulated data and the data clocks recovered by the clock recovery circuit 2 in the case of a signal of desired demodulation, in this embodiment, BPSK modulation, are shown in FIG. 6.

The waveform shown in FIG. 6 at (a) is for the received and demodulated data, and the waveform shown in FIG. 6 at (b) is for the data clocks recovered by the clock recovery circuit 2. In the first half portion in FIG. 6, the transition points of the received and demodulated data are regular and the phase differences between the transition points of the received and demodulated data and the data clocks are constant. The phase difference data is represented by "5" phase difference clocks as shown in FIG. 6 at (c). In the following, the phase difference data is represented simply by the number of phase difference clocks. In the second half portion in FIG. 6, at the portion where the low potential (zero) of the received and reproduced data continues, there is no transition point of the received and demodulated data. Therefore, at this portion, it is not possible to detect the phase difference between the transition point of the received and demodulated data and the recovered data clocks. At the other portions, the phase differences between the transition points of the received and demodulated data and the recovered data clocks are constant, and the phase difference data is "5" as shown in FIG. 6 at (c).

In the example shown in FIG. 6, the phase difference data outputted from the phase difference detector 2 takes a constant value if a signal of a desired modulation type is received, irrespective of the encoded contents of the received data.

On the other hand, if a signal not modulated by a desired type of modulation is received, the transition points of the received and demodulated data are generated at random as shown in FIG. 7 at (a). The data clocks recovered by the clock recovery circuit 1 have a waveform such as shown in FIG. 7 at (b). Therefore, the phase differences between the transition points of the received and demodulated data and the data clocks become random. Irrespective of the encoded contents of the received data, the phase difference data takes random values of "2", "1", "7", "8", and "4" in terms of the number of phase difference clocks such as shown in FIG. 7 at (c).

Examples other than those shown in FIGS. 6 and 7 and their calculation results are shown in Table 1. In Table 1, it is assumed that the deviation reference is "5", R for the average value calculation is "7", and the variable range of the phase difference data is from 0 to 10.

TABLE 1

| Status | No Reception of Desired Modulation Type Signal | |
|---|---|---|
| Status No. | (1) | (2) |
| Phase Difference | 8, 4, 1, 7, 3, 9, 2 | 3, 8, 4, 9, 1, 8, 2 |
| Deviation | 3, −1, −4, 2, −2, 4, −3 | −2, 3, −1, 4, −4, 3, −3 |
| Absolute Deviation | 3, 1, 4, 2, 2, 4, 3 | 2, 3, 1, 4, 4, 3, 3 |
| Deviation Square | 9, 1, 16, 4, 4, 16, 9 | 4, 9, 1, 16, 16, 9, 9 |
| Phase Difference Average | 4.85 | 5.00 |
| Deviation Average | −0.14 | 0.00 |
| Absolute Deviation Average (Average Deviation) | 2.71 | 2.85 |
| Deviation Square Average (Dispersion) | 8.43 | 9.14 |

| Status | Reception of Desired Modulation Type Signal | |
|---|---|---|
| Status No. | (3) | (4) |
| Phase Difference | 5, 5, 5, 5, 5, 9, 5 | 5, 5, 5, 5, 5, 5, 5 |
| Deviation | 0, 0, 0, 0, 0, 4, 0 | 0, 0, 0, 0, 0, 0, 0 |
| Absolute Deviation | 0, 0, 0, 0, 0, 4, 0 | 0, 0, 0, 0, 0, 0, 0 |
| Deviation Square | 0, 0, 0, 0, 0, 16, 0 | 0, 0, 0, 0, 0, 0, 0 |
| Phase Difference Average | 5.57 | 5.00 |
| Deviation Average | 0.57 | 0.00 |
| Absolute Deviation Average (Average Deviation) | 0.57 | 0.00 |
| Deviation Square Average (Dispersion) | 2.28 | 0.00 |

Table 1 shows calculated values of an absolute deviation, a phase difference average, and an absolute deviation average (average deviation). The absolute deviation is calculated by the following equation (4), the phase difference average is calculated by the following equation (5), the deviation average is calculated by the following equation (6), and the absolute deviation average (average deviation) is calculated by the following equation (7).

$$\text{Absolute Deviation} = |X_k - Y_k| \qquad (4)$$

$$\text{Phase Difference Average Value} = \sum_{K=1}^{n} \frac{(X_k - Y_k)}{n} \qquad (5)$$

$$\text{Deviation Average Value} = \frac{\sum_{K=1}^{n} (X_k - Y_k)}{n} \qquad (6)$$

$$\text{Absolute Deviation Average Value} = \sum_{K=1}^{n} \frac{|X_k - Y_k|}{n} \qquad (7)$$

In Table 1, the status numbers (1) and (2) stand for the case wherein a received signal is not modulated by a desired type of modulation, and the status numbers (3) and (4) stand for the case wherein a received signal is modulated by a desired type of modulation. The status number (3) stands for the case wherein the received signal has one noise represented by the phase difference data of "9", whereas the status number (4) stands for an ideal case without noise.

As seen from Table 1, in the calculation results of the phase difference average value and deviation average value, the values are cancelled out each other by (+) and (−) values so that although the states (1) and (4) can be discriminated, the states (2) and (4) cannot be discriminated. In contrast, if the average deviation values and dispersion values are used, the discrimination of the states (3) and (4) from the states (1) and (2) can be made because the values for the states (1) and (2) are different from those for the states (3) and (4). Furthermore, if the dispersion values are used rather than the average deviation values, the values for the states (3) and (4) are greatly different from those for the states (1) and (2). Therefore, the discrimination of the states (3) and (4) from the states (1) and (2) can be made more distinctly. The discrimination signal is therefore obtained based upon the dispersion value as in the case of this embodiment.

As described above, with the received signal modulation type discriminating circuit 10 of this embodiment, an output of the BPSK demodulator 13, i.e., the received and demodulated data, becomes random at its transition points if the received radio wave is the QPSK modulation wave, and the dispersion value becomes large. Therefore, it is discriminated that the received radio wave is not the BPSK modulation wave, and so the AFC circuit in the frequency converter 12 takes the RF scanning mode.

If the received radio wave is the BPSK modulation wave, an output of the BPSK demodulator 13, i.e., the received and demodulated data becomes stable, the transition points of the received and demodulated data are generated regularly, and the dispersion value becomes generally zero. Therefore, it is discriminated that the received radio wave is the BPSK modulation wave, and so the AFC circuit in the frequency converter 12 changes from the RF scanning mode to the lock mode. In this case, the discrimination signal is outputted immediately after the BPSK modulation wave is received without waiting for the detection of the sync code of the BPSK modulation wave, and the AFC circuit is switched immediately to the lock mode. Therefore, any part of the received data is not lost.

In the above embodiment, the BPSK modulation type is used as a desired modulation type. The invention is also applicable to the case wherein the desired modulation type is the QPSK modulation type instead of the BPSK modulation type. Furthermore, in the above embodiment, the dispersion value is calculated. Instead of the squaring circuit 4, an absolute deviation calculation circuit for calculating the absolute value of an output of the deviation calculation circuit 3, and instead of the average value calculation circuit 5, an absolute deviation average value calculation circuit for calculating an average value of n sets of an output of the absolute deviation calculation circuit, i.e., for calculating the absolute deviation average (average deviation) value, maybe provided to supply an output of the absolute deviation average value calculation circuit to the comparator 6.

As described so far, according to the received signal modulation type discriminating circuit of this invention, a discrimination whether the received signal is a signal of a desired modulation type can be made immediately after the received signal is changed to a signal of the desired modulation type, without waiting for the sync signal detection. Furthermore, since the discrimination is made based upon the calculation of the average value, a change in the received signal to be caused by noises or jitters can be smoothed. Therefore, the number of erroneous discriminations can be reduced and the correct discrimination is possible.

Still further, with the received signal modulation type discriminating circuit of this invention, the discrimination of the modulation type is made immediately after the AFC circuit is changed from the RF scanning mode to the lock mode by the discrimination signal. Accordingly, even if the number of preambles is small, any part of the received signal of the desired modulation type is not lost.

What is claimed is:

1. A circuit for discriminating the modulation type of a received signal, comprising:

a clock recovery circuit for recovering a data clock from received data;

a phase difference detector for detecting a phase difference between the data clock recovered by said clock recovery circuit and the received data;

a deviation calculation circuit for calculating a deviation between the phase difference detected by said phase difference detector and a deviation reference value preset in accordance with a modulation type;

a squaring circuit for squaring the deviation calculated by said deviation calculation circuit;

an average value calculation circuit for calculating an average value of a predetermined plurality number of consecutive ones of the square output calculated by said squaring circuit; and a comparator for comparing the average value calculated by said average value calculation circuit with a predetermined decision reference value and outputting a discrimination signal in accordance with the comparison results.

2. A circuit for discriminating the modulation type of a received signal, comprising:

a clock recovery circuit for recovering a data clock from received data;

a phase difference detector for detecting a phase difference between the data clock recovered by said clock recovery circuit and the received data;

a deviation calculation circuit for calculating a deviation between the phase difference detected by said phase difference detector and a deviation reference value preset in accordance with a modulation type;

an absolute deviation calculating circuit for calculating an absolute deviation of the deviation calculated by said deviation calculation circuit;

an absolute deviation average calculation circuit for calculating an average value of a predetermined plurality number of consecutive ones of the absolute deviation calculated by said absolute deviation calculating circuit; and a comparator for comparing the absolute deviation average value calculated by said absolute deviation average calculation circuit with a predetermined decision reference value and outputting a discrimination signal in accordance with the comparison results.

* * * * *